United States Patent [19]
Minor et al.

[11] Patent Number: 6,015,610
[45] Date of Patent: *Jan. 18, 2000

[54] VERY THIN HIGHLY LIGHT REFLECTANT SURFACE AND METHOD FOR MAKING AND USING SAME

[75] Inventors: Raymond B. Minor, Elkton, Md.; Gordon L. McGregor, Landenberg, Pa.; Huey Shen Wu, Newark; Daniel J. Lash, Bear, both of Del.

[73] Assignee: W. L. Gore & Associates, Inc., Newark, Del.

[*] Notice: This patent is subject to a terminal disclaimer.

[21] Appl. No.: 08/970,490

[22] Filed: Nov. 14, 1997

Related U.S. Application Data

[63] Continuation-in-part of application No. 08/910,096, Aug. 12, 1997, which is a continuation of application No. 08/562,651, Nov. 27, 1995, Pat. No. 5,781,342, which is a continuation-in-part of application No. 08/369,850, Jan. 6, 1995, Pat. No. 5,596,450.

[51] Int. Cl.$^7$ ............................................ B32B 3/26
[52] U.S. Cl. .................. 428/315.7; 428/317.9; 428/319.1; 428/339; 359/515; 359/599; 362/341
[58] Field of Search ............... 428/315.7, 317.9, 428/339, 421, 422, 318.4, 319.1; 359/515, 597; 362/341

[56] References Cited

U.S. PATENT DOCUMENTS

| | | | |
|---|---|---|---|
| 3,953,566 | 4/1976 | Gore | 264/288 |
| 3,962,153 | 6/1976 | Gore | 260/2.5 R |
| 4,035,085 | 7/1977 | Seiner | 356/179 |
| 4,096,227 | 6/1978 | Gore | 264/210 R |
| 4,152,618 | 5/1979 | Abe et al. | 313/116 |

(List continued on next page.)

FOREIGN PATENT DOCUMENTS

| | | |
|---|---|---|
| 0 313 263 | 10/1988 | European Pat. Off. . |
| 0 372 224 | 6/1990 | European Pat. Off. . |
| 0 496 323 A2 | 1/1992 | European Pat. Off. . |
| 7-235714 | 9/1995 | Japan . |
| 96/21168 | 7/1996 | WIPO . |
| 97/08571 | 3/1997 | WIPO . |
| WO 97/20238 | 6/1997 | WIPO . |
| WO 97/20882 | 6/1997 | WIPO . |

OTHER PUBLICATIONS

Literature: TK Lewellen, RS Miyaoka, SG Kohlmyer, "Improving the Performance of the SP–3000 PET Detector Modules," University of Washington, Seattle, Washington, Nov. 1991, pp. 1604–1608.

Literature: K. Wisshak, F. Kappeler, and H. Muller, "Prototype Crystals For the Karlsruhe 4 Barium Fluoride Detector," Physics Research A251 (1986) 101–107.

Literature: Carol J. Bruegge, Albert E. Stiegman, Daniel R. Coulter, Robert R. Hale, David J. Diner, "Reflectance stability analysis of Spectralon diffuse calibration panels," SPIE vol. 1493 (1991), pp. 132–142.

(List continued on next page.)

Primary Examiner—Blaine Copenheaver
Attorney, Agent, or Firm—Allan M. Wheatcraft

[57] ABSTRACT

The present invention provides and employs a very thin yet highly light reflective material for use in providing diffuse reflectivity of light, especially in tightly confined applications such as in laptop computer displays. The present invention uses an expanded polytetrafluoroethylene (PTFE) comprising a microstructure of polymeric nodes and fibrils combined with a coating or filler of material having a high index of refraction, such as titanium dioxide. The material of the present invention demonstrates exceptional diffuse reflectivity across a wide spectrum of visible and infrared light. Additionally, the material of the present invention provides many properties that have been previously unavailable in thin, highly diffuse reflective material, including a high degree of malleability, moldability and flexibility, and effective reflectivity even at very thin cross-sections.

15 Claims, 7 Drawing Sheets

U.S. PATENT DOCUMENTS

| | | | |
|---|---|---|---|
| 4,187,390 | 2/1980 | Gore | 174/102 R |
| 4,354,741 | 10/1982 | Mano et al. | 350/357 |
| 4,463,045 | 7/1984 | Ahr et al. | 428/131 |
| 4,504,889 | 3/1985 | Goldfarb | 362/200 |
| 4,523,319 | 6/1985 | Pfost | 372/54 |
| 4,571,448 | 2/1986 | Barnett | 136/259 |
| 4,764,932 | 8/1988 | Peterson et al. | 372/35 |
| 4,772,124 | 9/1988 | Wooten et al. | 356/218 |
| 4,805,181 | 2/1989 | Gibson et al. | 372/72 |
| 4,902,423 | 2/1990 | Bacino | 210/500.36 |
| 4,912,720 | 3/1990 | Springsteen | 372/72 |
| 4,994,673 | 2/1991 | Perna et al. | 250/483.1 |
| 5,037,618 | 8/1991 | Hager | 422/186.03 |
| 5,051,878 | 9/1991 | Ngai | 362/299 |
| 5,075,827 | 12/1991 | Smith | 362/221 |
| 5,116,115 | 5/1992 | Lange et al. | 351/212 |
| 5,192,128 | 3/1993 | Ngai | 362/297 |
| 5,241,180 | 8/1993 | Ishaque et al. | 250/361 R |
| 5,263,042 | 11/1993 | Kojima et al. | 372/72 |
| 5,378,965 | 1/1995 | Dakin et al. | 315/248 |
| 5,422,756 | 6/1995 | Weber | 359/487 |
| 5,460,872 | 10/1995 | Wu et al. | 428/304.4 |
| 5,462,705 | 10/1995 | Springsteen | 264/122 |
| 5,488,473 | 1/1996 | Springsteen et al. | 356/317 |
| 5,596,450 | 1/1997 | Hannon et al. | 359/599 |

OTHER PUBLICATIONS

Literature: A.W. Springsteen, "A Novel Class of Lambertian Reflectance Materials for Remote Sensing Application," Labsphere, Inc., SPIE, vol. 1109, Optical Radiation Measurements II (1989) pp. 133–141.

Technical Information: Arthur W. Springsteen, Ph.D., "Properties of Spectralon Reflectance Material," (Date Unknown).

General Information: Reflectance Component Fabrication, "Diffuse Reflectance Materials and Coatings, Spectralon, Spectraflect, Duraflect, Infragold and Infragold–LF," (Date Unknown).

Literature: "Solid Sample Measurements with the Cary 4 and Cary 5 Spectrophotometers," (Date Unknown) UV–VIS–NIR, Varian (VA).

Brochure: "Leadership," Dr. Arthur Springsteen, Lapshere (Date Unknown).

Brochure: "Labsphere Corporate Profile," Labsphere (Date Unknown).

Robert D. Saunders and Henry J. Kostkowski, "Roughened Quartz Surfaces and Teflon as small angle diffusers and depolarizers between 200 and 400 nm," Applied Optic, vol. 28, No. 15, Aug. 1, 1989 pp. 3242–3245.

Victor R. Weidner and Jack J. Hsia, "Reflection Properties of Pressed Polytetrafluoroethylene Powder," J. Optical Society of America, vol. 71, No. 7, Jul. 1981, pp. 856–861 International Search Report for PCT/US96/15111.

S. Nutter, C.R. Bower, N.W. Gebhard, R.M. Heinz and G. Spiczak, "Sintered Holan as a Diffuse Reflecting Liner for Light Integration Boxes," Nuclear Instruments & Methods in Physics Research, vol. A310, No. 3, Dec. 15, 1991, pp. 665–670.

International Search Report for PCT/US96/15111.

International Search Report for PCT/US96/16142.

VERY THIN HIGHLY LIGHT REFLECTANT SURFACE AND METHOD FOR MAKING AND USING SAME

The present application is a continuation-in-part of co-pending U.S. patent application Ser. No. 08/910,096, filed Aug. 12, 1997 (status: allowed), which in turn is a Continuation of U.S. patent application Ser. No. 08/562,651, filed Nov. 27, 1995, which issued as U.S. Pat. No. 5,781,342, which further in turn is a continuation-in-part of U.S. patent application Ser. No. 08/369,850, filed Jan. 6, 1995, which issued as U.S. Pat. No. 5,596,450.

BACKGROUND OF THE INVENTION

1. Field of the Invention

The present invention relates to surfaces used to reflect light, and particularly to highly light reflectant surfaces that provide even diffusion of light energy from their surfaces.

2. Description of Related Art

Special light reflectant surfaces are used in a variety of applications requiring light energy to be close to completely reflected while providing an even distribution of light from the surface. While good mirrored surfaces can provide nearly perfect reflectivity of visible light, the light energy exiting these surfaces does so only at an angle equal to the incident angle of light contact. For many applications it is important that light be reflected with an even distribution of light from the surface. This latter property is referred to as diffuse or "lambertian" reflectance.

The degree of diffuse light reflectivity is critical in many applications. For instance, displays used in electronic equipment (e.g., instrument panels, portable computer screens, liquid crystal displays (LCDs), etc.), whether relying on supplemental lights (e.g., backlight) or merely ambient light, require very good diffuse reflectant back surfaces to maximize image quality. Reflectivity is particularly critical with backlighted displays in battery powered equipment, where better reflectivity is directly related to smaller required light sources and resulting lower power demands.

One of the most demanding markets for reflective material is the portable or laptop computer display market. This market is demanding because it requires high levels of diffuse reflection from very thin materials. For example, it is very desirable in this market for the backlight reflector to be quite thin, i.e. less than 0.30 mm and preferably less than 0.15 mm, to minimize the thickness of the completed display assembly.

One of the materials commonly used as a diffuse reflector in laptop computer displays is a polyester film sold under the trade name of MELINEX® by ICI Films of Wilmington, Del. This material is available in very thin thicknesses, such as 0.15 to 0.3 mm. However, the maximum visible light reflectance of a 0.13 mm thick sheet of MELINEX polyester film is only about 88.4%. Furthermore, in measuring the diffuseness of this material, the diffusivity is much less than desired. Thicker films of this material, such as 0.25 mm thick material, achieves only a maximum visible reflectance of 94.3% while suffering from added thickness and undesirable stiffness.

In U.S. Pat. No. 5,596,450 to Hannon, et al., it is taught that exceptional diffuse light reflective properties can be achieved through use of an expanded polytetrafluoroethylene (PTFE) material that has a porous microstructure of polymeric nodes and fibrils. As is explained in that patent, sheets of expanded PTFE material have been demonstrated to have diffuse light reflective properties that exceed any other material presently known. For example, the Hannon et al. patent teaches that an expanded PTFE material with thicknesses above 1 mm will reflect over 98% of the visible light hitting its surface. A thinner material having a thickness of about 0.5 mm will still reflect about 97–98% of the visible light hitting its surface. While these light reflective properties are exceptionally high, this material does undergo significant decreases in diffuse light reflectivity as thicknesses decrease, particularly below 1 mm and especially below 0.5 mm.

Expanded PTFE material has been used in backlighted displays in the past. In U.S. patent application Ser. No. 08/520,633 to McGregor et al., which published as PCT Application WO 97/08571 on Mar. 6 1997, and issued as U.S. Pat. No. 5,838,406 on Nov. 17, 1998, it is taught that sheets of expanded PTFE can be used in backlit liquid crystal displays with excellent results. While that application teaches that expanded PTFE sheets can be created with a thickness range of 0.01 to 12.0 mm, it is taught that the thinner membranes should be layered into a thicker unit for use as a light reflective surface. The application tests sheets of expanded PTFE in a range of thicknesses of between 0.5 and 6.2 mm. While all of the tested materials demonstrated vastly improved diffuse reflectivity over previously available reflective materials, thinner material plainly suffered from diminished reflectivity. For instance, the 0.5 mm thick material demonstrated good reflectivity of about 97–98% across the visible spectrum of light (450–750 nm, but significantly less than those materials tested with thicknesses of 1.0 mm and above. There is no teaching in that application as to how to employ a material with very thin cross-section without substantial loss of light reflectivity.

Prior to the use of expanded PTFE material as a light reflector, the best known material was that described in U.S. Pat. No. 4,912,720 and sold under the trademark SPECTRALON by Labsphere, Inc., North Sutton, N.H. This material comprises lightly packed granules of polytetrafluoroethylene that has a void volume of about 30 to 50% and is sintered into a relatively hard cohesive block so as to maintain such void volume. Using the techniques taught by U.S. Pat. No. 4,912,720, it is asserted that exceptionally high diffuse visible light reflectance characteristics can be achieved with this material, with reflectance over previously available reflectant material increasing from 97% to better than 99% at a material thickness of at least 7 mm.

The reflectance of SPECTRALON also decreases significantly with decreasing thickness over most of the light spectrum. It is known that thin sections of SPECTRALON material, e.g., below 4 mm, may be doped with barium sulfate to help maintain light reflectance and diffuse properties. According to published data from the technical catalog of Labsphere, Inc., a 1 mm thick doped SPECTRALON material has a reflectance level of as high as 95.6% in the visible spectrum. It does not appear that SPECTRALON material is available in thin films of less than 1 mm thick, or very thin films of 0.30 mm or less, such as those desired for laptop displays. Furthermore at these thickness levels it is believed that adequate reflection performance can not be obtained with granulated PTFE material.

It should be evident that none of these previously described materials is particularly suitable to use in computer laptop displays since they all have significantly reduced reflectivity in thicknesses of less than 1 mm, much less the very thin 0.3 mm to 0.15 mm thicknesses of materials that are presently employed as computer laptop display reflectors.

Accordingly, it is a primary purpose of the present invention to provide a diffuse light reflective material that is both very thin and still has high light reflective properties.

It is a further purpose of the present invention to provide such a material that can be readily employed in backlit displays, such as those used in laptop computers and the like.

SUMMARY OF THE INVENTION

The present invention is a unique material that is both very thin and has high diffuse light reflectivity, achieving diffuse light reflectivity in excess of 97% at thicknesses of equal to or less than 0.3 mm. The material of the present invention achieves these exceptional properties by combining (1) a reflectant material of expanded polytetrafluoroethylene (PTFE) comprising polymeric nodes interconnected by fibrils defining a microporous structure; and (2) a filler or coating of high refractive index particles. At thicknesses of 0.3 mm or less, the material of the present invention has demonstrated reflectance levels higher than the best diffuse reflective materials presently available.

In the preferred form, the reflectant material of the present invention comprises an expanded PTFE material with a filler of titanium dioxide particles. Titanium dioxide particles provide a high index of light refraction. The titanium dioxide particles may also be applied as a coating on the expanded PTFE with similarly effective results. When these particles are combined with a thin expanded PTFE material, a material is produced that can be both very thin and still provides very good diffuse light reflectivity.

Equally important, the material of the present invention demonstrates other properties that make it particularly desirable for use as a reflectant material. The material is highly flexible, allowing it to be twisted and formed into a variety of shapes. This property vastly reduces the effort necessary to form many complicated reflective structures, and particularly non-planar structures. Moreover, many previously unattainable structures, such as extremely reflectant bendable structures, are now attainable through use of the present invention.

DESCRIPTION OF THE DRAWINGS

The operation of the present invention should become apparent from the following description when considered in conjunction with the accompanying drawings, in which.

DETAILED DESCRIPTION OF THE INVENTION

The present invention is an improved material and method for providing excellent diffuse light reflectance characteristics in a variety of reflectant products. As the term "light" is used herein, it is intended to include any form of electromagnetic radiation, but especially that in the spectrum of visible light (450–750 nm wavelength) and through infrared (IR) light radiation (700 to greater than 2500 nm wavelength).

Figure 1:
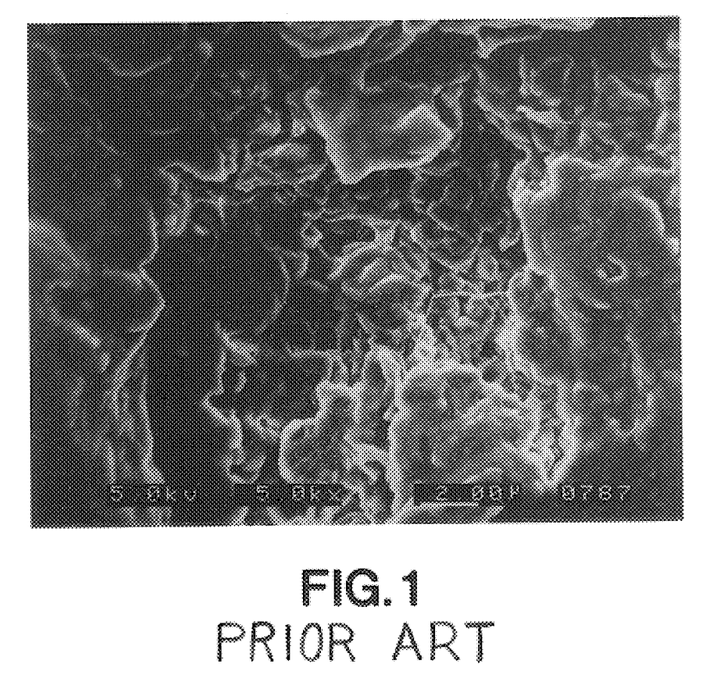
FIG. 1 is a scanning electron micrograph (SEM), enlarged 5000 times, showing the surface of a light reflectant material of a commercially available diffuse reflective material.
Figure 2:
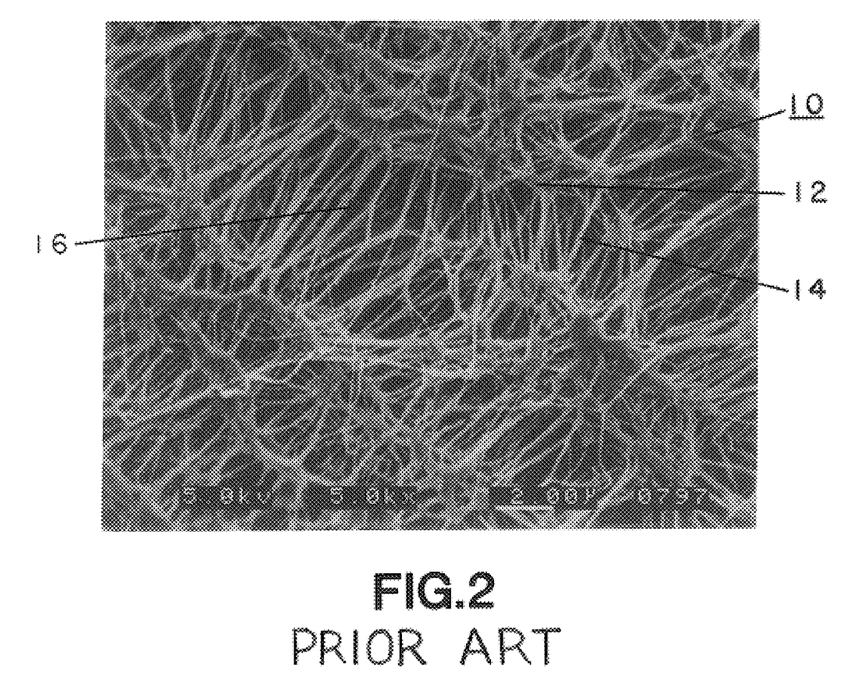
FIG. 2 is an SEM, enlarged 5000 times, showing the surface of one embodiment of a light reflectant material of another commercially available diffuse reflective material.

The materials previously described are illustrated in FIGS. 1 and 2. SPECTRALON diffuse reflectant material available from Labsphere, Inc., of North Sutton, N.H., is shown in the scanning electron micrograph (SEM) of FIG. 1. This material comprises a granular polytetrafluoroethylene material that is lightly packed and then molded into a rigid block. FIG. 1 shows a surface of a ½ inch thick reflectant sheet of SPECTRALON material. While this material provides good reflectivity of visible and near IR light, providing up to about 99% diffuse, "lambertian," reflectance over portions of that spectrum of light, the material has a number of drawbacks that constrain its use. Among the perceived problems with this material are: difficulty in processing due to its rigidity, especially where non-planar reflectant surfaces are required; limited range of effective light reflectance across visible and IR light spectrum; relatively thick minimum thicknesses (i.e., its effective reflectance diminishes at thicknesses of less than about 4 mm); and less than optimum diffuse reflectivity.

The material described in U.S. Pat. No. 5,596,450, incorporated by reference, is now commercially available from W. L. Gore and Associates, Inc., under the trademark DRP. As has been described above, this material comprises a microporous structure of expanded polytetrafluoroethylene (PTFE) having microscopic polymeric fibrils (i.e., thread-like elements) interconnecting polymeric nodes (i.e., points from which fibrils emerge). The structure of a biaxially expanded example of this material is shown in the SEM of FIG. 2. This material 10 comprises polymeric nodes 12 and numerous fibrils 14 extending from the nodes 12. As can be seen, numerous microporous voids 16 are provided within the material 10. As the term "expanded PTFE" is used herein, it is intended to include any PTFE material having a node and fibril structure, including in the range from a slightly expanded structure having fibrils extending from relatively large nodes of polymeric material, to an extremely expanded structure having fibrils merely intersect with one another at nodal points. Expanded PTFE materials are generally described in, inter alia, U.S. Pat. Nos. 3,953,566, 3,962,153, 4,096,227, 4,187,390, and 4,902,423, all incorporated by reference.

Figure 3:
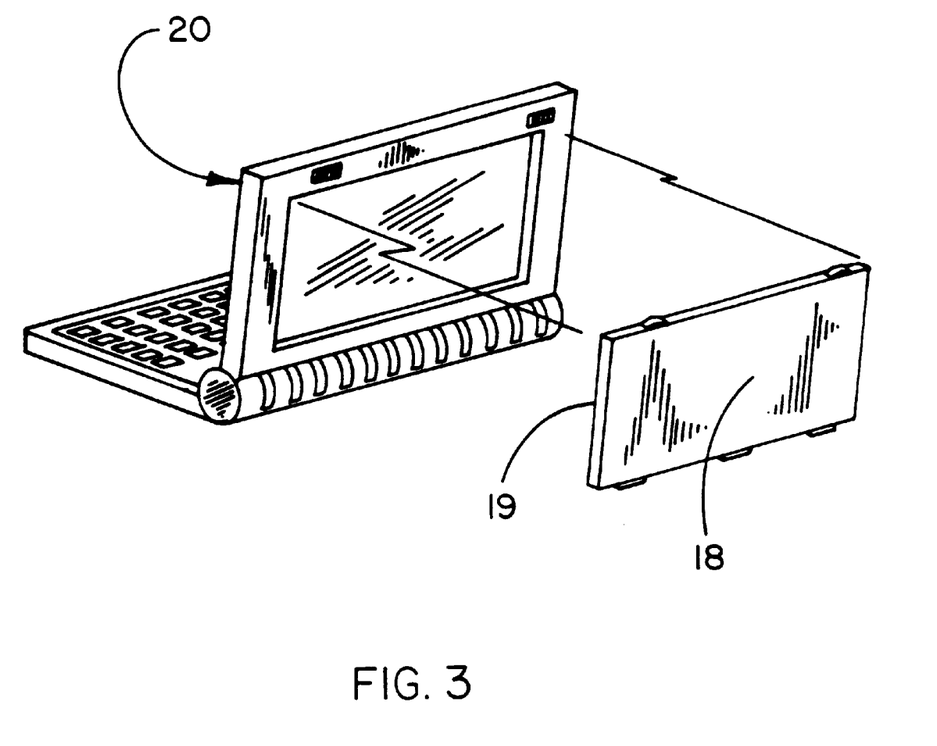
FIG. 3 is an isometric view of a laptop computer display partially in cut-away to illustrate a reflective backplane mounted therein.

As has been explained, neither of these previously available materials is entirely suitable for uses that demand both high reflectivity and very thin cross-sections. Illustrated in FIG. 3 is one such use wherein a thin light reflective material 18 is employed as a reflective backplane of a backlight 19 in a laptop computer display 20. As has been explained, it is important in these applications to have a very thin material (e.g., less than 0.3 mm in thickness, and preferably less than 0.2 mm in thickness) that is still highly light reflective. Thickness limitations are desirable since compactness and light weight are critical elements in the compact computer market. High light reflectivity is also important since light loss in the display results in greater light demands, thus increasing undesirable battery drain. As has been noted, presently manufacturers are willing to sacrifice some light reflectivity in exchange for very thin materials, such as MELINEX polyester film.

The constraints of thinness and high light reflectivity are both met by the material of the present invention. The material of the present invention comprises an expanded PTFE with the addition of a high index of refraction filler or coating material. A coating or filling of high index of refraction particles enables the material to refract light with a higher degree of efficiency for each surface interface than expanded PTFE material alone. Therefore, the present invention combines the properties of high index of refraction with a fine node and fibril structure as a means to create a high diffuse reflectant material of thin cross section.

The term "high index of refraction filler or coating material" as used herein is meant to describe any filler or coating material which has an index of refraction higher than PTFE (that is, an index of refraction ranging from 1.30–1.40, depending on degree of crystallinity of the PTFE). Preferably, the filler or coating used in the present invention should have an index of refraction greater than or equal to 1.42. Even more preferably, a filler or coating should have an index of refraction of 1.5 or above. Most preferably, the filler or coating used in the present invention has an index of refraction of 2.0 or above.

Table 1 is a partial list of high index of refraction materials that can be employed in the present invention with their corresponding refractive indices.

TABLE 1

| Material | Index of Refraction |
|---|---|
| Barium Sulfate (BaSO$_4$) | 1.64–1.65 |
| Titanium Dioxide (TiO$_2$) | 2.49–2.90 |
| Aluminum Oxide (Al$_2$O$_3$) | 1.76–1.77 |
| Zinc Oxide (ZnO) | 2.01–2.03 |
| PVDF | 1.42 |
| Polyester | 1.56–1.64 |
| Polystyrene homopolymer | 1.55–1.60 |

It should be evident from the above discussion and review of Table 1 that the preferred high index of refraction materials for use in the present invention are zinc oxide, with an index of refraction of greater than about 2, and especially titanium dioxide, with an index of refraction of greater than about 2.4.

With respect to polymeric materials, these can be used in the form of particles or they can be dissolved in a solvent. When distributed in a solvent (for instance, a polystyrene in toluene), the mixture can be painted on the expanded PTFE surface to provide a coating. It is preferred in the present invention to coat or fill expanded PTFE with inorganic particles suspended in an aqueous solution. The inorganic particles used in the present invention may range from size from about 1 nanometer to about 1 mm. The particles can be any shape, such as spheres, rods, needle-like, or irregular shapes. The polymeric material may also be melted and then coated onto the nodes and fibril structure of the expanded PTFE, which may deform or eliminate the original shape and size of the particles.

PTFE has a number of important properties that make it particularly suitable as a reflectant surface. PTFE is a highly inert material that is hydrophobic. Accordingly, the material is resistant to both water and a wide variety of other materials that could damage some other reflectant surfaces. Additionally, by expanding PTFE in the manner taught by U.S. Pat. No. 3,953,566 to form the node and fibril structure, the material undergoes a significant increase in tensile strength and becomes highly flexible. Moreover, while packed granular based PTFE material provides good diffuse reflectant properties, it has been discovered that the node and fibril structure of expanded PTFE provides a much higher diffuse reflectance property.

A preferred reflectant material of the present invention is made in the following manner. A fine powder PTFE resin is blended with a lubricant such as odorless mineral spirits and a high index of refraction filler such as titanium dioxide (TiO$_2$) particles until a compound is formed. The volume of lubricant used should be sufficient to lubricate primary particles of the PTFE resin so to minimize the potential of the shearing of the particles prior to extruding. The preferred filler amount is approximately 20% by weight, within the broad range of about 5 to 50% by weight and a preferred range of about 10 to 30% by weight.

A fine powder PTFE resin may be combined with a high index of refraction particulate through one of at least two different methods. "Particulate" is meant to include individual particles of any aspect ratio and thus includes flock, flakes, powders, etc. In one method, an amount of fine powder PTFE resin is mixed with an amount of high index of refraction particulate filler and a sufficient quantity of a mineral spirit, preferable an odorless mineral spirit, in a blender to obtain an intimate mixture of the components and form a compound. It is preferable to combine fine powder PTFE resin with the mineral spirit prior to the addition of the particulate filler to the blender in order to obtain a consistent mixture of the fine powder PTFE resin and the particulate filler.

In another preferred method, an aqueous dispersion PTFE resin is obtained. Into the aqueous dispersion, a high index of refraction particulate filler is added. This mixture is coagulated by rapid shearing of the aqueous dispersion, or through destabilization of the aqueous dispersion with salt, acid, polyethylene imine or the like. A coagulum of fine powder PTFE resin and particulate is subsequently formed and dried into cakes. When dry, the cakes are carefully crumbed and lubricated with a mineral spirit and blended forming a compound.

The compound by either of the previously described methods is then compressed into a billet and extruded, such as through a ram type extruder, to form a coherent sheet of extrudate. A reduction ratio of about 30:1 to 300:1 may be used (i.e., reduction ratio=cross-sectional area of extrusion cylinder divided by the cross-sectional area of the extrusion die). For most applications a reduction ratio of 75:1 to 100:1 is preferred.

The lubricant may then be removed, such as through volatilization, and the dry coherent extrudate sheet is expanded rapidly in at least one direction about 1.1 to 50 times its original length (with about 1.5 to 2.5 times being preferred). Expansion may be accomplished, such as through the method taught in U.S. Pat. No. 3,953,566, by passing the dry coherent extrudate over a series of rotating heated rollers or heated plates at a temperature of between about 100 and 325° C. Alternatively, the extruded sheet may be expanded in the manner described in U.S. Pat. No. 4,902,423 to Bacino, prior to removal of the lubricant.

In either case, the material may be further expanded at a ratio of 1:1.1 to 50:1 (with 5:1 to 35:1 being preferred) to form a final microporous sheet. Preferably the sheet is biaxially expanded so as to increase its strength in both its longitudinal and transverse directions. Finally, the material may be subjected to an amorphous locking step by exposing it to a temperature in excess of 340° C.

In another preferred embodiment, the expanded PTFE nodes and fibrils can be coated with a high index of refraction material. A desirable coating is one that is thin in cross section and does not significantly affect the microporous nature of the expanded PTFE node and fibril structure. One method of achieving this thinly coated node and fibril structure is described in U.S. Pat. No. 5,460,872 to Wu et al., incorporated by reference. This patent describes a method using aqueous colloidal dispersion of submicron size polymer particles to coat the internal structure that defines the pores of microporous substrates. The microporous substrates are polymeric materials having very small pores from one side to the other, such as porous PTFE, porous polyethylene, and porous polypropylene.

Various high index of refraction materials are suitable for coating the node and fibril structure. Some of the different groups of possible coating materials, in addition to the previous mentioned high index of refraction materials, along with their refractive index (RI) are as follows:

(1) Polymers containing aromatic ring structures are most preferred. Examples include polystyrene (RI=1.60), polyethylene terephthalate (RI=1.57), polyaromatic imide, and the like.
(2) Polymers containing heterocyclic ring structures are also preferred. Examples include cellulose fiber (RI=1.618) and cellulose derivatives and other types of polysaccharides.
(3) Polymers containing chlorine atoms are good. Examples include polyvinyl chloride (RI=1.54) and poly (chloroprene) (Neoprene) (RI=1.558).
(4) Most of rubbers are good, because of unsaturated bonds. Examples include natural rubber (RI=1.53), poly (butadiene) (RI=1.50), and poly(isobutene-co-isoprene) (RI=1.50).
(5) Polymers with conjugated bonds. Examples include polyacrylonitrile (RI=1.52), and polymethylmethacrylate (RI=1.49).
(6) Polymers containing lots of oxygen atoms (i.e., total oxygen to carbon atoms number ratio is equal or higher than 1/2) are also good. Examples include poly (oxymethylene) (RI=1.55).

It may be useful to combine both high index of refraction fillers and coatings in the same material to further enhance the reflective performance of the invention.

The material of the present invention is preferably made in the form of sheets, which, due to their inherent flexibility, may be formed into a wide variety of other shapes as desired, such as tubes, strips, convex or concave structures, etc. Additionally, to address particular applications, the material of the present invention may likewise be extruded or otherwise formed into continuous tubes, rods (i.e., cylinders), rectangles, uneven shapes and other structures that may be of interest.

Sheets made from the above processing steps can be produced in thicknesses ranging from, but not limited to, 0.01 mm to 2 mm. Sheets can be subsequently layered upon themselves and subjected to temperatures ranging from about 300° C. to 400° C. while applying sufficient pressures to bond the layers together.

Figure 4:
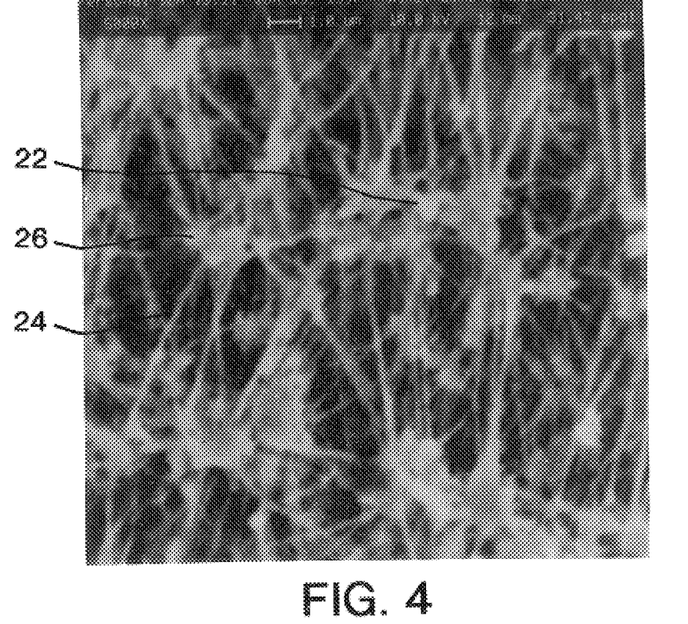
FIG. 4 is an SEM, enlarged 5000 times, showing the surface of another embodiment of a light reflectant material of the present invention.
Figure 5:
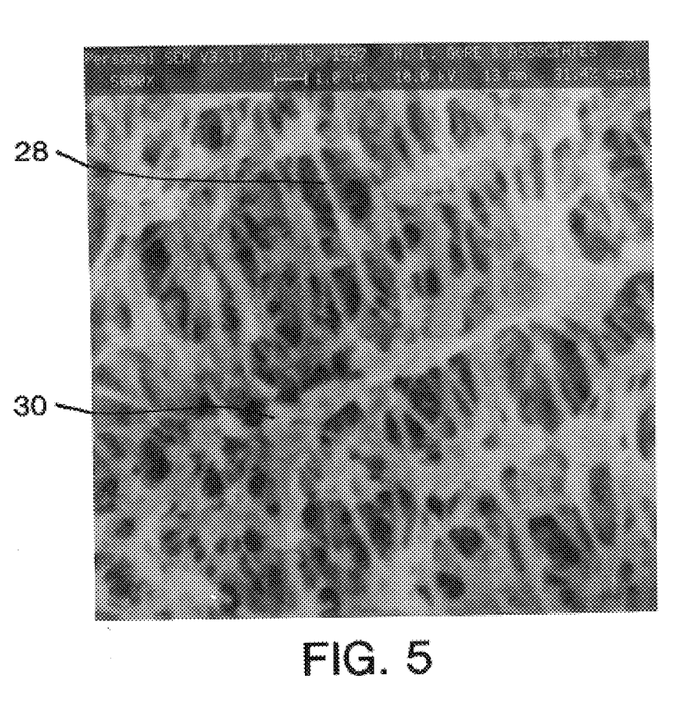
FIG. 5 is an SEM, enlarged 5000 times, showing the surface of another embodiment of a light reflectant material of the present invention.

It has been determined that by providing a microporous surface of polymeric nodes and fibrils, such as that of expanded PTFE with a high index of refraction filler or coating, and particularly one that has been expanded in more than one direction, light is reflected off the node and fibril structure at a very high efficiency rate, with very even diffuse dispersion (i.e., diffusion) of the light. The SEM of FIG. 4 shows expanded PTFE material with a high index refraction filler 22 (in this instance, titanium dioxide) that has undergone extensive expansion in two different directions. This structure exhibits a relatively "fine" structure with small fibrils 24 oriented in both x and y directions, and small nodes 26 where the fibrils intersect. The SEM of FIG. 5 shows expanded PTFE material with a high index of refraction coating of polystyrene homopolymer on the node and fibril structure. Again this structure has undergone extensive expansion in two different directions. This structure exhibits a relatively "fine" structure with small fibrils 28 oriented in both x and y directions, and small nodes 30 where the fibrils intersect. As can be seen, both the high index of refraction filler and coating has not substantially affected the microporous voids created by the node and fibril structure inherent in the expanded PTFE.

As is explained in greater detail below, the present invention demonstrates high diffuse reflectivity at very thin cross sections. When compared to the commercial PTFE reflectors of SPECTRALON material, doped SPECTRALON material, and DRP material, the reflectant material of the present invention exhibited substantially higher diffuse reflectivity at thin cross sections.

Figure 6A:
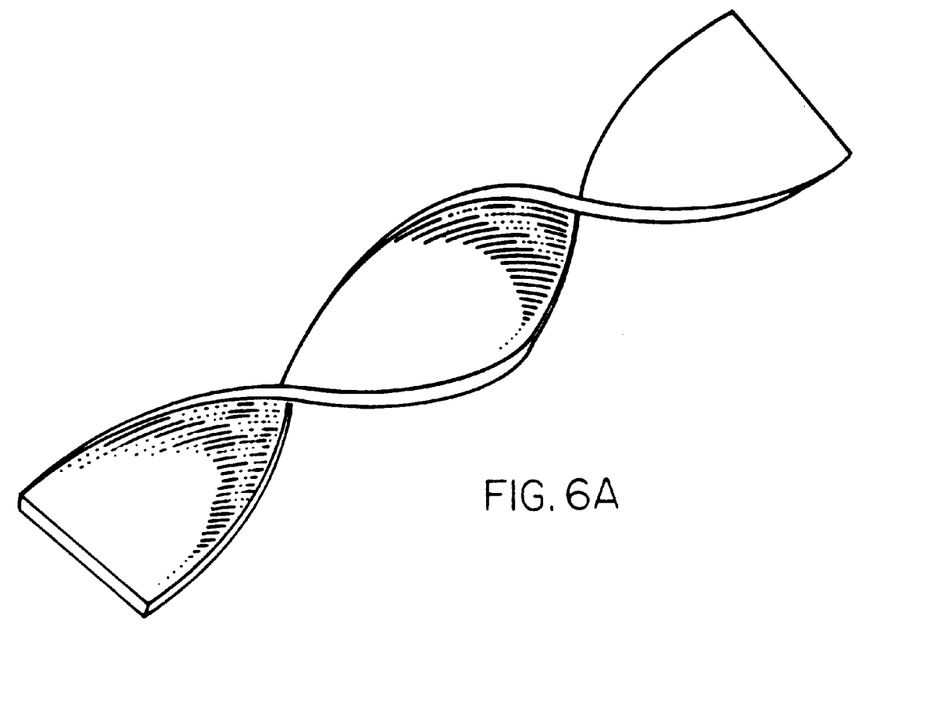
FIG. 6 is a three-quarter isometric view of a reflectant material of the present invention, wherein the flexibility of the material is demonstrated.
Figure 6B:
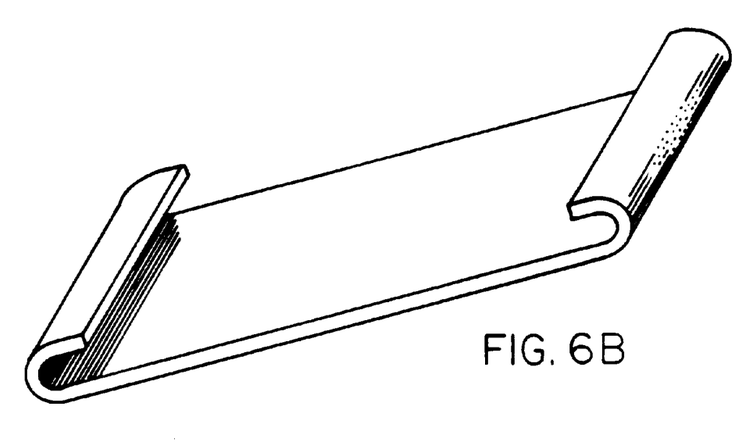

Another important property of the present invention is shown in FIG. 6. The reflectant material 10 of the present invention is highly malleable, moldable, and flexible, allowing it to be bent, twisted, curved, or otherwise formed into any suitable shape. In this respect, the reflectant material of the present invention is a dramatic improvement over previously available highly reflective materials, such as SPECTRALON polytetrafluoroethylene reflectant materials that must be carved or machined into desired shapes. In fact, due to the very thin cross-sectional thickness of the material of the present invention, it is even more malleable and flexible than the very flexible DRP material disclosed in U.S. Pat. No. 5,596,450. Accordingly, a host of different non-planar shapes can be formed from the material of the present invention with minimal effort. These types of thin, flexible, formable materials having at least 93%, 95%, 96%, and even 97% reflectivity should have great value for a host of applications such as projection screens, backlighted displays, luminaire reflectors, photographic umbrellas, numerical keypads for cellular telephones, etc.

The present invention may comprise single or multiple layers of expanded PTFE, or may comprise a laminate of one or more layers of expanded PTFE and a backing support material. Since the expanded PTFE membrane alone tends to be susceptible to stretching and distortion, for some applications it may be preferred that the membrane be mounted to a support layer, such as through lamination to a flexible woven or non-woven material, that will help maintain the shape of the image layer during use. One suitable support layer is applied by applying an adhesive material, such as moisture curable polyurethane or solvated polyurethane, to the expanded PTFE membrane and then applying the adhesive-coated expanded PTFE membrane to a flexible backing material (e.g., polyester, polypropylene, MYLAR®, KEVLAR®, nylon, etc.). The two materials can then be bonded to each other under applied pressure, such as by rolling the material between one or more pairs of nip rollers. With use of a moisture curable polyurethane adhesive to bond an expanded PTFE membrane to a woven fabric, such as nylon, pressure of 1150 g per linear meter is applied to bond the materials together. The materials are then allowed to moisture cure for a period of about 48 hours before use.

In addition, to create complex shapes, an expanded PTFE sheet can be bonded to a rigid support material and then formed as a composite into shapes, such as parabolic or ellipsoidal domes. One suitable method for such forming techniques comprises using vacuum forming devices.

The present invention is particularly suitable for use with a variety of applications. These include reflectometers, integrating spheres, spectrophotometers, etc. One application of particular interest may be use of the present invention in solar collectors or photovoltaic cells. Since solar-driven devices such as these generally use sunlight in the range of 300 to 2200 nm, the reflectance of the present invention is particularly suitable.

Without intending to limit the scope of the present invention, the following examples illustrate how the present invention may be made and used:

Comparative Example 1

A reflective sheet made in accordance with U.S. Pat. No. 5,596,450 is produced in the following manner:

A fine powder PTFE resin is combined with an odorless mineral spirit. The volume of mineral spirits used per gram of fine powder PTFE resin is 0.275 cc/gm. This mixture is aged below room temperature to allow for the mineral spirits to become uniformly distributed within the PTFE fine powder resin. This mixture is compressed into a billet and extruded at approximately 8300 kPa through a 0.71 mm gap die attached to a ram type extruder to form a coherent extrudate. A reduction ratio of 75:1 is used.

The extrudate is then rolled down between two metal rolls which are heated to between 30–40° C. The final thickness after roll down is 0.20 mm. The material is transversely expanded at a ratio of 3:1 and then the mineral spirits are removed from the extrudate by heating the mass to 240° C. (i.e., a temperature where the mineral spirits were highly volatile). The dried extrudate is transversely expanded at 150° C. at a ratio of 3.5:1. After expansion, the sheet is amorphously locked at greater than 340° C. and cooled to room temperature.

Multiple layers of this sheet material are then stacked, placed under pressure, and exposed to a temperature of about 360° C. for about 30 minutes to bond the layers into a cohesive sheet. Samples of composite sheets comprising about 4, 5, 7, and 8 layers of expanded PTFE sheets are produced having thickness levels of 0.15, 0.20, 0.25, and 0.30 mm, respectively.

EXAMPLE 2

An aqueous dispersion of PTFE resin is obtained. Into the aqueous dispersion, a particulate $TiO_2$ filler is added to produce a 20% by weight final dried mixture. This mixture is coagulated by rapid shearing of the aqueous dispersion. A coagulum of the fine powder PTFE resin and the $TiO_2$ filler is subsequently formed and dried into cakes. When dry, the cakes are carefully crumbled and lubricated with an odorless mineral spirit. The amount of mineral spirits used is 0.20 grams per gram of PTFE/$TiO_2$ dry powder mixture.

This mixture is aged below room temperature to allow for the mineral spirits to become uniformly distributed within the PTFE/$TiO_2$ powder resin. This mixture is compressed into a billet and extruded at 10,300 kPa through a 0.64 mm gap die attached to a ram type extruder to form a coherent extrudate. A reduction ratio of 84:1 is used.

The extrudate is then rolled down between two metal rolls which are heated to about 50° C. The final thickness after roll down is 0.20 mm. The material is transversely expanded at a ratio of 3:1 and then the mineral spirits are removed from the extrudate by heating the mass to 250° C. (i.e., a temperature where the mineral spirits were highly volatile). The dried extrudate is transversely expanded at 150° C. at a ratio of 3.5:1. After expansion, the sheet is amorphously locked at greater than 340° C. and cooled to room temperature.

Multiple layers of this sheet material are then stacked, placed under pressure, and exposed to a temperature of about 360° C. for about 30 minutes to bond the layers into a cohesive sheet. Samples of composite sheets comprising about 3, 6, and 8 layers of expanded PTFE/$TiO_2$ sheets are produced having thickness levels of 0.13, 0.23, and 0.30 mm, respectively.

These samples from Examples 1 and 2 are tested in the following manner to quantify their reflective properties:

A 50 mm by 50 mm swatch from each sample is placed in a Perkin Elmer Lambda 18 spectrophotometer with a Labsphere integrating sphere. The spectral range measured is 450 nm to 750 nm. All measurements are made in the double-beam mode with the same working standard in the sphere's reference reflectance port. The reflectance standard used is of SPECTRALON material, Labsphere Identification number SRS-99-020. All measurements are normalized with respect to the baseline of the system. This data is then corrected by multiplying it by the correction factors supplied with the reflectance standard. This data is then averaged and plotted.

Figure 7:
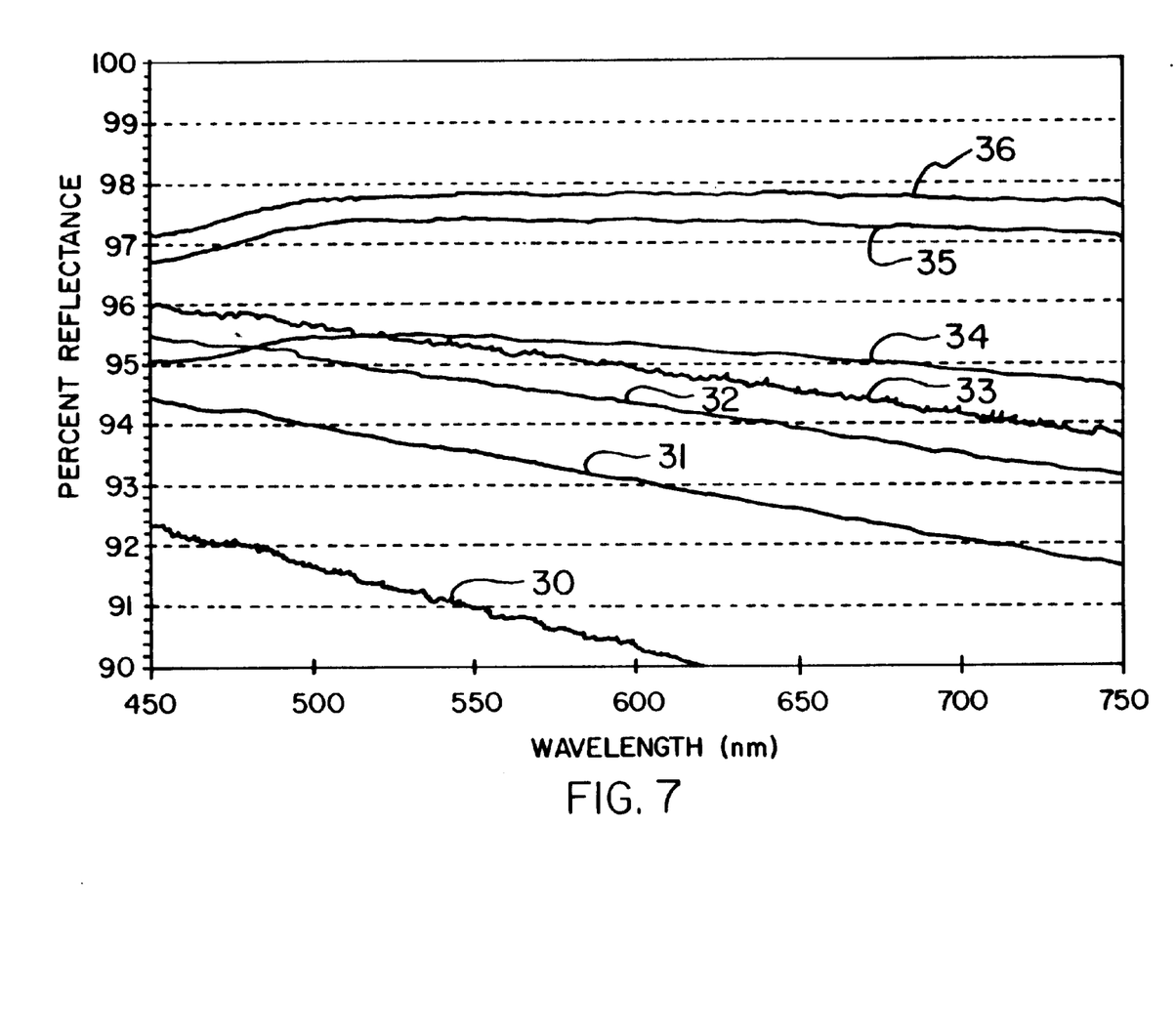
FIG. 7 is a graph plotting the reflectance versus wavelength of varying thicknesses of the reflectant material of the present invention as compared to commercially available materials.

The graph of FIG. 7 records the reflectance verses light wavelength of three samples of varying thickness of the present invention as compared with four samples of varying thickness of comparative commercially available reflectant materials. Lines 30, 31, 32, and 33 represent the performance of the comparative material of Example 1 at thickness levels of 0.15, 0.20, 0.25, and 0.30 mm respectively. Lines 34, 35, and 36 represent the performance of the inventive material of Example 2 at thickness levels of 0.13, 0.23, and 0.30 mm, respectively. As can be seen, at all wavelengths of light tested, the reflectant material of the present invention demonstrated markedly higher reflectivity than the comparative reflectant materials of similar thickness.

Figure 8:
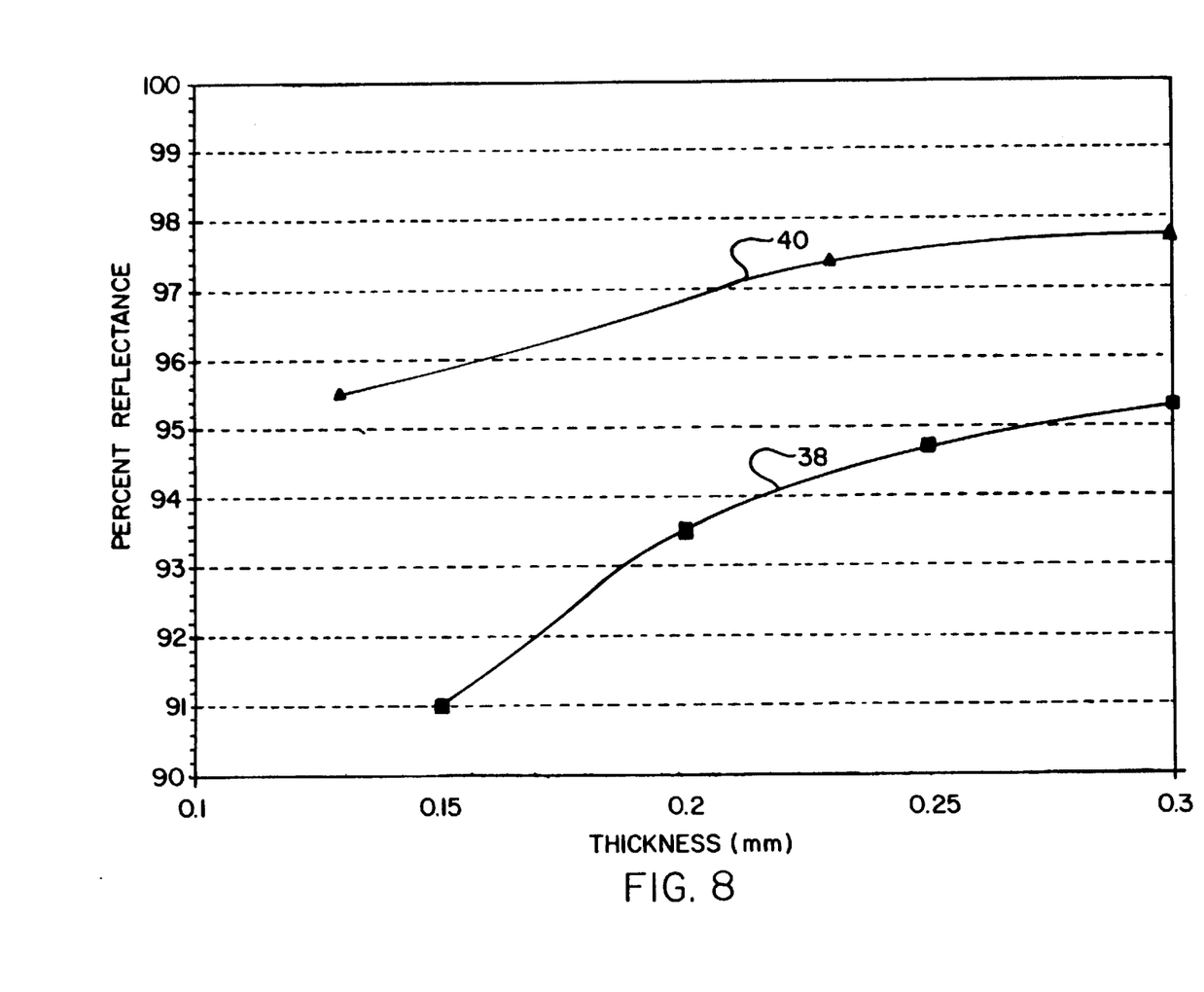
FIG. 8 is a graph plotting the reflectance versus thickness at 550 nm of varying thicknesses of the reflectant material of the present invention as compared to commercially available materials.

The graph of FIG. 8 represents data from the same above Examples 1 and 2 plotting the reflectance at 550 nm versus thickness for each of the samples. Line 38 represents the performance of the comparative material. Line 40 represents the performance of the inventive material. Again, it can be seen that throughout the entire thickness range of 0.30 mm and below the inventive material has a significantly higher reflectance.

The above Examples demonstrate that the reflectant material of the present invention performs far better as a diffuse reflectant material than the best diffuse PTFE reflectant materials presently commercially available at thickness levels of 0.30 mm or less.

EXAMPLE 3

An aqueous dispersion of polystyrene nanoparticles is prepared based on the following semi-batch microemulsion polymerization procedure:

In a one-liter glass reactor, 30 grams of styrene monomer, 60 grams of sodium lauryl sulfate, and 300 grams of distilled water are charged and sealed. The glass reactor is then immersed in a constant temperature bath at 80° C. With a gentle stirring of the mixture at about 200 rpm for about 30 minutes, the mixture becomes a one-phase clear microemulsion at 80° C. Stirring speed is maintained at about 200 rpm throughout the process. Then 0.20 gram sodium persulfate in 12 grams of distilled water is charged to the glass reactor to initiate free radical polymerization.

After about 15 minutes, the mixture is white and translucent and does not change appearance further with time. At this point, 29 grams of styrene is charged to the mixture at 80° C. to form a microemulsion, presumably using the excess surfactant available from the previous polymerization reaction. This step is followed 5 minutes later by addition of 0.29 gram of sodium persulfate in 12 grams of distilled water to initiate the next batch polymerization. After about 15 minutes, the mixture is white and translucent.

Then 28 grams of styrene is charged to the mixture at 80° C., followed 5 minutes later with the addition of 0.28 gram of sodium persulfate in 20 grams of distilled water to the reactor. After about 15 minutes, the mixture is white and translucent.

Then 27 grams of styrene is charged to the mixture at 80° C., followed 5 minutes later with the addition of 0.27 gram of sodium persulfate in 20 grams of distilled water to the reactor. After about 15 minutes, the mixture is white and translucent.

Then 26 grams of styrene is charged to the mixture at 80° C., followed 5 minutes later with the addition of 0.26 gram of sodium persulfate in 20 grams of distilled water to the reactor. After about 15 minutes, the mixture is white and translucent.

Then 25 grams of styrene is charged to the mixture at 80° C., followed 5 minutes later with the addition of 0.25 gram of sodium persulfate in 20 grams of distilled water to the reactor. After about 15 minutes, the mixture is white and translucent.

Then 24 grams of styrene is charged to the mixture at 80° C., followed 5 minutes later with the addition of 0.24 gram of sodium persulfate in 20 grams of distilled water to the reactor. After about 15 minutes, the mixture is white and translucent.

Then 23 grams of styrene is charged to the mixture at 80° C., followed 5 minutes later with the addition of 0.23 gram of sodium persulfate in 20 grams of distilled water to the reactor. After about 15 minutes, the mixture is white and translucent.

Then 22 grams of styrene is charged to the mixture at 80° C., followed 5 minutes later with the addition of 0.22 gram of sodium persulfate in 20 grams of distilled water to the reactor. After about 15 minutes, the mixture is white and translucent.

Then 21 grams of styrene is charged to the mixture at 80° C., followed 5 minutes later with the addition of 0.21 gram of sodium persulfate in 20 grams of distilled water to the reactor. The mixture is maintained at 80° C. for one hour, and reaction is then stopped by cooling the mixture to room temperature. The final latex is translucent. A solution of 28% polystyrene nanoparticles in water is obtained with average particle size of about 60 nanometers (as determined by a light scattering method).

The coating procedure on expanded PTFE membrane is described as follows: At room temperature, the said aqueous dispersion of 28% by weight of polystyrene nanoparticles was diluted with deionized water to 8% by weight of polystyrene nanoparticles (average particle size 60 nanometer) with additionally 4.5% of ammonium perfluoro octanoate surfactant added to the dispersion. Then the aqueous dispersion was used to coat by a pipette an expanded PTFE membrane with an average pore size of 0.35 micron and a thickness of 0.036 mm with a density of 0.55 gm/cc constrained on a pin frame. Excess fluid on the membrane was wiped out by the pipette. Then the coated membrane on the pin frame was placed in an oven of 200 degree C. for two minutes. The membrane was dried and ready for optical testing. The membrane remained microporous after drying. There was a weight gain of the expanded PTFE membrane of 18% due to the polystyrene coating.

EXAMPLE 4

An aqueous dispersion of PVDF (polyvinylidene fluoride) nanoparticles is made based on the following procedure:

In a 2-liter pressure reactor, 50 grams of ammonium perfluorooctanoate (FLUORAD FC-143 manufactured by 3M), and 900 grams of distilled water are charged and sealed. The reactor is evacuated repeatedly three times by vacuum and purged with vinylidene fluoride monomer. The final aqueous mixture contains less than 20 ppm of oxygen. Then, 25 grams of perfluorodecalin is charged into the reactor under a constant 900 rpm speed of agitation. The reactor is then filled with vinylidene fluoride monomer and the reaction mixture is heated to 80° C. by heated jacket. Agitation speed is maintained at about 900 rpm throughout the reaction process. Initial reaction pressure is 2.0 MPa. Then 2.0 gram of ammonium persulfate (APS) in 100 grams of distilled water is charged to the reactor to initiate free radical polymerization. The reaction temperature is maintained between 80 and 85° C. and the pressure is maintained at 2.0 MPa by continuous charging of vinylidene fluoride gas. Total reaction time is about 3 hours. Reaction is stopped by lowering reaction temperature to room temperature and evacuation of the reactor system. The resulting aqueous dispersion looks transparent, containing 32% by weight of PVDF nanoparticles with average particle size about 35 nanometer as is determined by a light scattering method.

The coating procedure on expanded PTFE membrane is described as follows: At room temperature, the aqueous dispersion of PVDF nanoparticles is diluted with deionized water to 8% by weight of PVDF nanoparticles (average particle size 35 nanometer) with additional surfactant added to be about 5.6% ammonium perfluoro octanoate surfactant in final dispersion. It is then used to coat by a pipette an expanded PTFE membrane with an average pore size of 0.35 micron and a thickness of 0.036 mm with a density of 0.55 gm/cc constrained on a pin frame. Excess fluid on the membrane is wiped out by the pipette. Then the coated membrane on the pin frame is placed in an oven of 200° C. for two minutes. The membrane is dried and ready for optical testing. The membrane remains microporous after drying. There is a weight gain of the expanded PTFE membrane of 20% due to the PVDF polystyrene coating.

Figure 9:
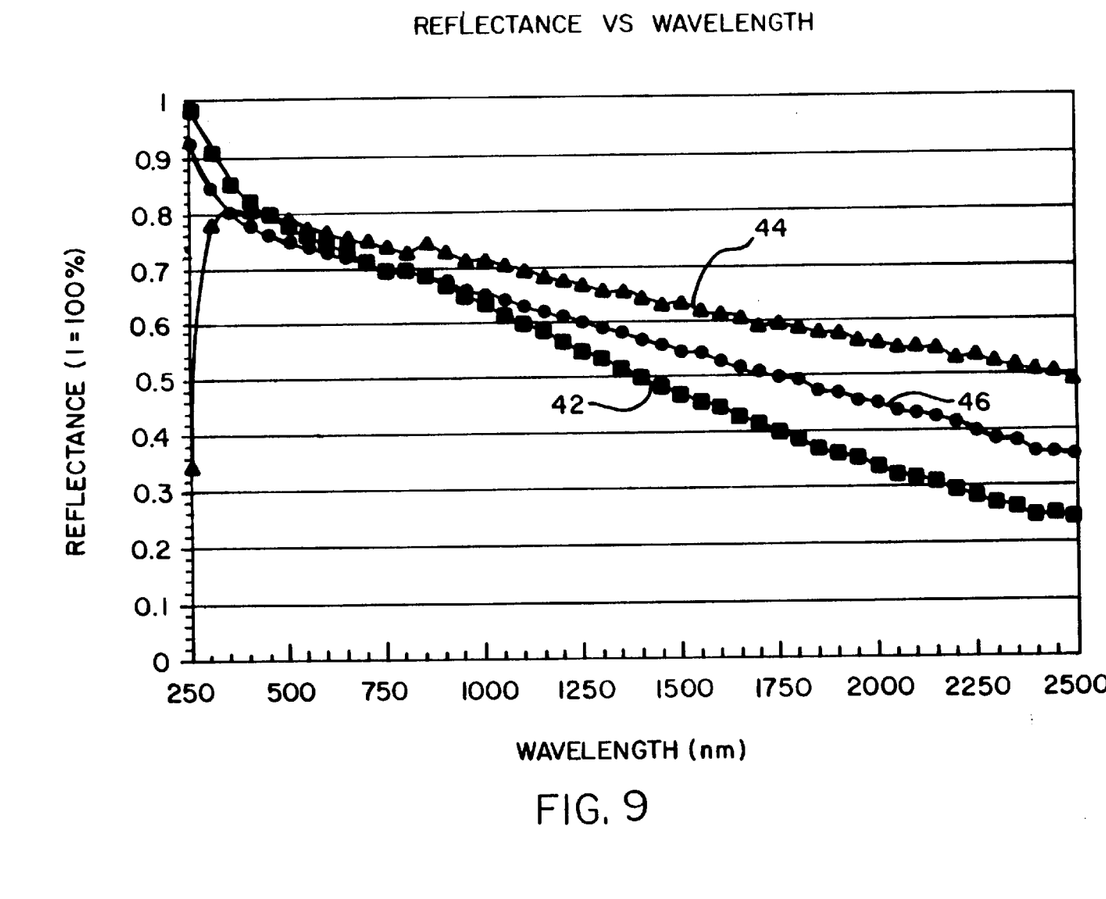
FIG. 9 is a graph plotting the reflectance versus wavelength of the reflectant material of the present invention as compared to a control example.

FIG. 9 represents the reflectance vs. wavelength of a comparative uncoated reflective material 42 and the two inventive high index of refraction coated materials from Examples 3 and 4, lines 44 and 46, respectively. The inventive materials are made using the comparative uncoated material as the base material. These materials are tested for reflectance using a CARY 5E Spectrophotometer with a Labsphere integrating sphere in the range of 250 to 2500 nanometers.

It can be seen that through most of the measured wavelengths, the high index refraction coatings increased the reflectance of the base material. The material made in accordance with Example 3 has a higher index of refraction coating than the material made in accordance with Example 4 and also has the largest increase in reflectance over the base material through most of the tested wavelengths.

Due to the diffuse reflectant and structural properties of the present invention, it can be used in a plethora of possible applications. As a general reflectant material, the present invention can be employed to form reflectant screens (e.g., projection TV or movie screens), reflectors for back lit displays, highway information placards, luminaires, etc. Furthermore, specialized reflectors for fluorescent or incandescent lighting can be designed for hospital or clean room environments where soft diffuse lighting is desired yet cleanliness and contamination must be minimized. Expanded PTFE, because of its inertness and inherent non-particulation characteristics, is ideally suited for these applications.

The high flexibility of the present invention particularly lends itself to such applications since it can be rolled or otherwise compacted, as is often required, and it can be easily formed into different shapes, and particularly non-planar shapes. The present invention's ability to provide effective reflectance at very thin dimensions also lends itself to use in this regard, particularly by allowing greater design flexibility and by decreasing the cost and weight of the material.

Finally, the present invention may prove extremely useful in a variety of other applications, including use in solar collector, photocells, and other applications where high diffuse reflectivity is desirable.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A light reflective material comprising
    an expanded polytetrafluoroethylene having a micro structure of polymeric nodes, fibrils, and voids;
    a coating on the nodes and fibrils of the expanded polytetrafluoroethylene comprising particles with an index of refraction greater than 1.5;
    wherein the light reflective material has a total thickness of no more than 0.3 mm; and
    wherein the light reflective material provides diffuse reflectivity of at least 96% of visible light with a wavelength between at least 450 to 750 nm striking the reflectant material.

2. The light reflective material of claim 1 wherein the coating comprises particle with an index of refraction of greater than 2.

3. The light reflective material of claim 2 wherein the coating comprises titanium dioxide.

4. A light reflective material comprising an expanded polvetrafluoroethylene having a microstructure of polymer nodes, fibrils, and voids; a coating on the nodes and fibrils of the expanded polytetraflouroethylene comprising particles with an index of refraction greater than 1.5; wherein the light reflective material has a total thickness of no more than 0.2 mm; and the light reflective material provides diffuse reflectivity of at least 95% of visible light with a wavelength between at least 450 to 750 nm striking the light reflective material.

5. A light reflective material comprising an expanded polytetrafluoroethylene having a microstructure of polymer nodes, fibrils, and voids; a coating on the nodes and fibrils of the expanded polytetraflouroethylene comprising particles with an index of refraction greater than 1.5; wherein the light reflective material has a total thickness of no more than 0.15 mm; and the light reflective material provides diffuse reflectivity of at least 93% of visible light with a wavelength between at least 450 to 750 nm striking the light reflective material.

6. A light reflective material comprising an expanded polvetrafluoroethylene having a microstructure of polymer nodes, fibrils, and voids; a coating on the nodes and fibrils of the expanded polytetraflouroethylene comprising particles with an index of refraction greater than 1.5; wherein the light reflective material has a total thickness of no more than 0.3 mm; and wherein the light reflective material provides diffuse reflectivity of at least 97% of visible light with a wavelength between at least 450 to 750 nm striking the light reflective material.

7. A method of providing improved diffuse reflectivity of light comprising
    providing a reflectant material comprising an expanded polytetrafluoroethylene having polymeric nodes interconnected by fibrils defining microporous voids therein;
    wherein the expanded PTFE is combined with a high index of refraction material, the reflectant material is equal to or less than 0.30 mm in thickness;
    mounting the reflectant material to cause light energy to reflect off it; and
    using the reflectant material to provide diffuse reflectivity with equal to or greater than 97% of visible light with a wavelength between at least 450 to 750 nm striking the reflectant material.

8. The method of claim 7 wherein said high index of refraction material is a coating on the expanded PTFE nodes and fibrils.

9. The method of claim 8 that further comprises providing a reflectant material with a thickness of equal to or less than 0.3 mm.

10. The method of claim 8 that further comprises providing a reflectant material with a thickness of less than 0.20 mm.

11. The method of claim 8 that further comprises providing a reflectant material with a thickness of less than 0.1 mm.

12. The method of claim 7 wherein said high index of refraction material is particles in the microporous voids in the reflectant material.

13. A method of providing improved diffuse reflectivity of light comprising
    providing a reflectant material comprising an expanded polytetrafluoroethylene having polymeric nodes interconnected by fibrils defining microporous voids therein;
    wherein the expanded PTFE is combined with a high index of refraction material, the reflectant material is equal to or less than 0.25 mm in thickness;
    mounting the reflectant material to cause light energy to reflect off it; and
    using the reflectant material to provide diffuse reflectivity with equal to or greater than 96% of visible light with a wavelength between at least 450 to 750 nm striking the reflectant material.

14. A method of providing improved diffuse reflectivity of light comprising providing a reflectant material comprising an expanded polytetrafluoroethylene having polymeric nodes interconnected by fibrils defining microporous voids therein;

wherein the expanded PTFE is combined with a high index of refraction material, the reflectant material is equal to or less than 0.20 mm in thickness;

mounting the reflectant material to cause light energy to reflect off it; and using the reflectant material to provide diffuse reflectivity with equal to or greater than 95% of visible light with a wavelength between at least 450 to 750 nm striking the reflectant material.

15. A method of providing improved diffuse reflectivity of light comprising providing a reflectant material comprising an expanded polytetrafluoroethylene having polymeric nodes interconnected by fibrils defining microporous voids therein;

wherein the expanded PTFE is combined with a high index of refraction material, the reflectant material is equal to or less than 0.15 mm in thickness;

mounting the reflectant material to cause light energy to reflect off it; and using the reflectant material to provide diffuse reflectivity with equal to or greater than 93% of visible light with a wavelength between at least 450 to 750 nm striking the reflectant material.

* * * * *